United States Patent [19]
Aitken

[11] Patent Number: 5,153,151
[45] Date of Patent: * Oct. 6, 1992

[54] HIGH INDEX FLUORINE-FREE PHOSPHATE GLASSES

[75] Inventor: Bruce G. Aitken, Erwin, N.Y.

[73] Assignee: Corning Incorporated, Corning, N.Y.

[*] Notice: The portion of the term of this patent subsequent to Jun. 4, 2008 has been disclaimed.

[21] Appl. No.: 696,173

[22] Filed: May 6, 1991

[51] Int. Cl.$^5$ .......................... C03C 3/16; C03C 3/17; C03C 4/00

[52] U.S. Cl. ...................................... 501/45; 501/47; 501/48

[58] Field of Search .............................. 501/45, 47, 48

[56] References Cited

U.S. PATENT DOCUMENTS

| | | | |
|---|---|---|---|
| 3,407,091 | 10/1968 | Budsiecker | 501/45 |
| 3,979,322 | 9/1976 | Alexeev et al. | 501/45 |
| 4,026,714 | 5/1977 | Lewis | 501/48 |
| 4,248,732 | 2/1981 | Myers | 501/45 |
| 4,362,819 | 12/1982 | Olszewski | 501/44 |
| 4,439,530 | 3/1984 | Tajima | 501/45 |
| 4,481,023 | 11/1984 | Marechal et al. | 65/64 |
| 4,874,724 | 10/1989 | Beall et al. | 501/48 |
| 4,940,677 | 7/1990 | Beall et al. | 501/45 |
| 5,021,366 | 6/1991 | Aitken | 501/45 |

Primary Examiner—Mark L. Bell

[57] ABSTRACT

This invention is drawn to fluorine-free glasses having refractive indices of at least 1.65 which generally consist, in mole percent, of:

| | |
|---|---|
| $P_2O_5$ | 24–36 |
| ZnO | 0–45 |
| $Li_2O$ | 0–15 |
| $Na_2O$ | 0–20 |
| $K_2O$ | 0–10 |
| $Ag_2O$ | 0–25 |
| $Tl_2O$ | 0–25 |
| $Li_2O + Na_2O + K_2O + Ag_2O + Tl_2O$ | 15–30 |
| PbO | 0–20 |
| CaO | 0–20 |
| CuO | 0–5 |
| $CeO_2$ | 0–2 |
| SrO | 0–20 |
| BaO | 0–20 |
| CaO + SrO + BaO | 0–25 |
| $Sb_2O_3$ | 0–61 |
| $Bi_2O_3$ | 0–10 |
| $Sb_2O_3 + Bi_2O_3$ | 0–61 |
| $Sb_2O_3 + Bi_2O_3 + Ag_2O + Tl_2O$ | 7–76 |
| SnO | 0–5 |
| $Al_2O_3$ | 0–5 |
| $B_2O_3$ | 0–10 |
| $Al_2O_3 + B_2O_3$ | 0–10 |

4 Claims, No Drawings

HIGH INDEX FLUORINE-FREE PHOSPHATE GLASSES

BACKGROUND OF THE INVENTION

U.S. application Ser. No. 07/599,751, filed Oct. 19, 1990 by me under the title FLUORINE-FREE PHOSPHATE GLASSES, now U.S. Pat. No. 5021,366, is directed to the preparation of chemically durable, weather resistant, essentially fluorine-free glass compositions with annealing points within the range of about 300°–340° C., thereby enabling them to be molded into lenses at temperatures of about 360°–400° C., and with refractive indices of about 1.605 and linear coefficients of thermal expansion (25°–300° C.) between 145–170×10$^{-7}$/°C. Those glasses were designed to replace the alkali metal fluoroaluminophosphate glasses disclosed in U.S. Pat. No. 4,362,819 (Olszewski et al.) marketed by Corning Incorporated, Corning, New York for pressing optically finished lenses as described in U.S. Pat. No. 4,481,023 (Marechal et al.) As was explained in that application, fluorine in the glasses attacked the surfaces of the molds during pressing of the lenses, and volatilization thereof during melting of the glass batch gave rise to environmental hazards. The glasses of U.S. Ser. No. 07/599,751 consisted essentially, expressed in terms of mole percent on the oxide basis, of:

| | | | |
|---|---|---|---|
| $Li_2O$ | 5–10 | $P_2O_5$ | 30–36 |
| $Na_2O$ | 5–15 | $Al_2O_3$ | 0–5 |
| $K_2O$ | 0–6 | $CeO_2$ | 0–2 |
| $Li_2O + Na_2O + K_2O$ | 15–25 | SnO | 0–20 |
| ZnO | 10–33 | PbO | 0–20 |
| CaO | 0–20 | $Sb_2O_3$ | 0–12 |
| SrO | 0–20 | $Bi_2O_3$ | 0–6 |
| BaO | 0–20 | $SnO + PbO + Sb_2O_3 + Bi_2O_3$ | 0–20 |

The primary objective of the instant invention was to devise fluorine-free glass compositions demonstrating chemical and physical properties similar to those exhibited by the glasses of U.S. Ser. No. 07/599,751, but wherein refractive indices ranging from at least 1.65 to values in excess of 1.8 can be achieved. In like manner to the definition set out in U.S. Ser. No. 07/599,751, the expression essentially fluorine-free indicates that no material containing substantial concentrations of fluorine is intentionally included in the glass.

SUMMARY OF THE INVENTION

That objective can be attained in glasses having base compositions within the $R_2O-P_2O_5$ system, wherein $R_2O$ consists of at least one metal oxide selected from the group consisting of $Li_2O$, $Na_2O$, $K_2O$, $Ag_2O$, and $Tl_2O$. The compositions can desirably also contain at least one metal oxide selected from the group consisting of $Bi_2O_3$, PbO, and $Sb_2O_3$. At least one member of the group $Ag_2O$, $Bi_2O_3$, PbO, $Sb_2O_3$, and $Tl_2O$ must be present to assure attainment of the required high refractive index, viz., at least 1.65, coupled with the desired low annealing point, viz., 300°–340° C., and linear coefficient of thermal expansion, viz., 135–180×10$^{-7}$/°C. over the temperature range 25°–300° C. Hence, more specifically, the inventive glasses consist essentially, expressed in terms of mole percent on the oxide basis, of:

| | | | |
|---|---|---|---|
| $P_2O_5$ | 24–36 | SrO | 0–20 |
| ZnO | 0–45 | BaO | 0–20 |
| $Li_2O$ | 0–15 | $CaO + SrO + BaO$ | 0–25 |
| $Na_2O$ | 0–20 | $Sb_2O_3$ | 0–61 |
| $K_2O$ | 0–10 | $Bi_2O_3$ | 0–10 |
| $Ag_2O$ | 0–25 | $Sb_2O_3 + Bi_2O_3$ | 0–61 |
| $Tl_2O$ | 0–25 | $Sb_2O_3 + Bi_2O_3 + Ag_2O + Tl_2O$ | 7–76 |
| $Li_2O + Na_2O + K_2O + Ag_2O + Tl_2O$ | 15–30 | SnO | 0–5 |
| PbO | 0–20 | $Al_2O_3$ | 0–5 |
| CuO | 0–5 | $B_2O_3$ | 0–10 |
| CaO | 0–20 | $Al_2O_3 + B_2O_3$ | 0–10 |
| $CeO_2$ | 0–2 | | | with the provisos that:

(a) in the absence of $Sb_2O_3$ and/or $Bi_2O_3$, the total $Ag_2O + Tl_2O$ will range 11–25;

(b) in the absence of $Ag_2O$ and/or $Tl_2O$, the total $Sb_2O_3 + Bi_2O_3$ will range 7–61;

(c) when present in the absence of $Bi_2O_3$ and/or $Ag_2O$ and/or $Tl_2O$, $Sb_2O_3$ will range 10–61 and, when present in the absence of $Sb_2O_3$ and/or $Ag_2O$ and/or $Tl_2O$, $Bi_2O_3$ will range 7–10;

(d) when present in the absence of $Bi_2O_3$, $Sb_2O_3$, and $Tl_2O$, $Ag_2O$ will range 13–25; and (e) when present in the absence of $Ag_2O$, $Bi_2O_3$, and $Sb_2O_3$, $Tl_2O$ will range 11–25.

As will be appreciated, the required combination of chemical and physical properties demands that the above-outlined composition intervals be strictly observed, with special attention being directed to the levels of $Ag_2O$, $Bi_2O_3$, $Sb_2O_3$, and $Tl_2O$. Thus, their inclusion raises the refractive index of the base glass as desired, but also impacts upon other properties of the glass for which compensation must be made. To illustrate:

$Ag_2O$ and $Tl_2O$ behave in like manner to the alkali metal oxides in softening the glass, i.e., lowering the annealing point thereof. At the same time, however, they adversely affect the chemical durability and weatherability of the glasses.

The inclusion of alkaline earth metal oxides acts to raise the refractive index of the glass somewhat without increasing the dispersion therein and raising the annealing point thereof, while also improving the chemical durability thereof. Nevertheless, when the total concentration of alkaline earth metal oxides exceeds 25%, the glasses become quite susceptible to devitrification.

Whereas the addition of PbO to a glass composition is well-recognized in the art as raising the refractive index thereof, its inclusion increases the dispersion therein. Moreover, the linear coefficient of thermal expansion is raised significantly through the addition of PbO to the inventive base compositions which must be offset through the addition of $Sb_2O_3$ and/or SnO and/or $Al_2O_3$ and/or $B_2O_3$ and/or alkaline earth metal oxides. Consequently, whereas PbO can be tolerated in the inventive glasses, it will desirably be maintained at a relatively low level.

As was alluded to immediately above, $Al_2O_3$, $B_2O_3$, and SnO act to enhance the chemical durability of the inventive glasses. The concentrations thereof must be held at low concentrations, however, to avoid elevating the annealing point of the glass outside of the desired range.

$Sb_2O_3$ is more preferred than $Bi_2O_3$ for raising the refractive-index. It is less subject to reducing conditions and is much more soluble in the base glass than $Bi_2O_3$.

$Ag_2O$ and $Tl_2O$ exert an extreme effect upon the refractive index of the glass. That is, the refractive index commonly increases by about 0.008 per mole percent addition of $Tl_2O$ and by about 0.0065 per mole percent addition of $Ag_2O$. $Tl_2O$ demonstrates a further advantage over $Ag_2O$ in that the glasses are characterized by better weatherability.

When desired, $CeO_2$ may be included to render the glasses resistant to such radiations as x-radiations.

Whereas it is not mathematically possible to convert composition intervals expressed in terms of mole percent to exact composition ranges described in terms of weight percent, the following values represent approximations of the compositions of the inventive glasses defined in terms of weight percent:

| | | | |
|---|---|---|---|
| $P_2O_5$ | 11.1–47.2 | SrO | 0–11.1 |
| ZnO | 0–34.2 | BaO | 0–25.9 |
| $Li_2O$ | 0–4.5 | CaO + SrO + BaO | 0–29.7 |
| $Na_2O$ | 0–12.2 | $Sb_2O_3$ | 0–82.0 |
| $K_2O$ | 0–9.2 | $Bi_2O_3$ | 0–39.6 |
| $Ag_2O$ | 0–46.5 | $Sb_2O_3 + Bi_2O_3$ | 0–83.4 |
| $Tl_2O$ | 0–61.4 | $Sb_2O_3 + Bi_2O_3 + Ag_2O + Tl_2O$ | 17.5–88.8 |
| $Li_2O + Na_2O + K_2O + Ag_2O + Tl_2O$ | 1.9–64.4 | SnO | 0–7.3 |
| PbO | 0–34.3 | $Al_2O_3$ | 0–5.1 |
| CaO | 0–12.2 | $B_2O_3$ | 0–7.0 |
| CuO | 0–4.0 | $Al_2O_3 + B_2O_3$ | 0–8.4 |
| $CeO_2$ | 0–4.0 | | | with the provisos that:

(a) in the absence of $Sb_2O_3$ and/or $Bi_2O_3$, the total $Ag_2O + Tl_2O$ will range 17.7–64.4;

(b) in the absence of $Ag_2O$ and/or $Tl_2O$, the total $Sb_2O_3 + Bi_2O_3$ will range 17.5–83.4;

(c) when present in the absence of $Bi_2O_3$ and/or $Ag_2O$ and/or $Tl_2O$, $Sb_2O_3$ will range 17.5–82.0 and, when present in the absence of $Sb_2O_3$ and/or $Ag_2O$ and/or $Tl_2O$, $Bi_2O_3$ will range 18.7–39.6;

(d) when present in the absence of $Bi_2O_3$, $Sb_2O_3$, and $Tl_2O$, $Ag_2O$ will range 17.7–46.5; and (e) when present in the absence of $Ag_2O$, $Bi_2O_3$, and $Sb_2O_3$, $Tl_2O$ will range 24.8–61.4.

In essence, the instant inventive glasses are founded in the utilization of at least one of the group $Ag_2O$, $Bi_2O_3$, $Sb_2O_3$, and $Tl_2O$ to raise the refractive index of the glasses disclosed in U.S. Ser. No. 07/599,751, but wherein the concentrations of the other components of the latter glasses have been altered to produce products exhibiting the desired ranges of chemical and physical properties.

PRIOR ART

In addition to U.S. Ser. No. 07/599,751, the following patent is also believed to have relevance to the instant inventive glasses:

U.S. Pat. No. 3,853,568 (Chvatal) discloses three groups of $Ag_2O$-containing glass compositions, one of which comprised, in weight percent, 20–70% $Ag_2O$ and 30–80% of two oxides selected from the group of $As_2O_3$, $B_2O_3$, $Bi_2O_3$, $GeO_2$, $P_2O_5$, $Sb_2O_3$, and $TeO_2$. The patent referred to the following two ranges of components within that group which are pertinent to the present inventive glasses:

| | | | | | |
|---|---|---|---|---|---|
| $Sb_2O_3$ | 10–45 | $Ag_2O$ | 20–60 | $P_2O_5$ | 30–50 |

-continued

| | | | | | |
|---|---|---|---|---|---|
| $Bi_2O_3$ | 10–45 | $Ag_2O$ | 20–60 | $P_2O_5$ | 30–45 |

Whereas partial overlap may be possible between those ranges and those of the inventive glasses, no mention is made in the patent to pressing lenses and the chemical and physical properties required in glasses destined for that application, and none of the working examples supplied in the patent had a composition coming within the ranges of the inventive glasses.

DESCRIPTION OF THE PREFERRED EMBODIMENTS

Table I records a group of glass compositions melted on a laboratory scale and reported in terms of mole percent on the oxide basis illustrating the parameters of the present inventive glasses. Table IA lists the same group of compositions expressed in terms of parts by weight on the oxide basis. Inasmuch as the sum of the individual components recited in Table IA totals or very closely approximates 100, for all practical purposes the tabulated values may be deemed to reflect weight percent. The actual batch ingredients can comprise any materials, either oxides or other compounds, which, when melted in combination with the other constituents, will be converted into the desired oxide in the proper proportions. For example, zinc orthophosphate may be employed as a source of ZnO and $P_2O_5$, and $Li_2CO_3$ and $AgNO_3$ may comprise the sources of $Li_2O$ and $Ag_2O$, respectively.

The batch ingredients were compounded, tumble mixed together to aid in obtaining a homogeneous melt, and then charged into platinum crucibles. After placing lids thereon, the crucibles were moved into a furnace operating at about 900°–1200° C. and the batches melted for about three hours. Thereafter, the melts were poured into steel molds to produce glass slabs having dimensions of about 6"×4"×0.5" which were transferred immediately to an annealer operating at about 300°–325° C.

(Whereas the above description reflects melting on a laboratory scale only, it must be appreciated that large scale melts thereof can be conducted in commercial melting units. Thus, it is only necessary that the batch materials be melted at a temperature and for a time sufficient to secure a homogeneous melt.)

TABLE I

| (Mole Percent) | | | | | | | | |
|---|---|---|---|---|---|---|---|---|
| | 1 | 2 | 3 | 4 | 5 | 6 | 7 | 8 |
| $Li_2O$ | 7.0 | 7.0 | 7.0 | 7.0 | 7.0 | 7.0 | 7.0 | 6.6 |
| $Na_2O$ | 8.0 | 8.0 | 8.0 | 8.0 | 8.0 | 8.0 | 8.0 | 7.5 |
| $K_2O$ | 5.0 | 5.0 | 5.0 | 5.0 | — | — | — | — |
| ZnO | 13.5 | 11.0 | 10.0 | 21.0 | 18.5 | 13.5 | 11.0 | 9.4 |
| CaO | 10.0 | 10.0 | 10.0 | 7.5 | 10.0 | 10.0 | 10.0 | 9.4 |
| BaO | 5.0 | 5.0 | 3.5 | 7.5 | 5.0 | 5.0 | 5.0 | 3.3 |
| SnO | 1.0 | 1.0 | 1.0 | 1.0 | 1.0 | 1.0 | 1.0 | 0.9 |
| $Sb_2O_3$ | 15.0 | 17.5 | 20.0 | — | 10.0 | 15.0 | 17.5 | 18.7 |
| $Bi_2O_3$ | — | — | — | 8.0 | — | — | — | — |
| $Tl_2O$ | — | — | — | — | 5.0 | 5.0 | 5.0 | 11.0 |
| $Al_2O_3$ | 0.5 | 0.5 | 0.5 | — | 0.5 | 0.5 | 0.5 | 0.5 |
| $P_2O_5$ | 35.0 | 35.0 | 35.0 | 35.0 | 35.0 | 35.0 | 35.0 | 32.7 |
| | 9 | 10 | 11 | 12 | 13 | 14 | 15 | 16 |
| $Li_2O$ | 7.0 | 7.0 | 7.0 | 7.0 | 7.0 | 7.0 | 7.0 | 6.1 |
| $Na_2O$ | 8.0 | 8.0 | 8.0 | 8.0 | 8.0 | 8.0 | 8.0 | 7.0 |
| $K_2O$ | 5.0 | 5.0 | 5.0 | 5.0 | 5.0 | 5.0 | 5.0 | 4.4 |
| ZnO | 10.0 | 10.0 | 10.0 | 18.5 | 8.5 | — | — | 2.5 |
| CaO | 6.8 | 1.8 | 3.5 | — | — | — | — | — |
| BaO | 6.7 | 1.7 | — | — | — | — | — | — |

TABLE I-continued (Mole Percent)

|       | | | | | | | | |
|-------|------|------|------|------|------|------|------|------|
| SnO   | 1.0  | 1.0  | 1.0  | 1.0  | 1.0  | 1.0  | 1.0  | 1.0  |
| PbO   | —    | —    | —    | —    | —    | —    | —    | 20.0 |
| $Sb_2O_3$ | 20.0 | 30.0 | 30.0 | 25.0 | 35.0 | 43.5 | 46.0 | 21.8 |
| $Al_2O_3$ | 0.5 | 0.5 | 0.5 | 0.5 | 0.5 | 0.5 | 0.5 | 2.2 |
| $P_2O_5$ | 35.0 | 35.0 | 35.0 | 35.0 | 35.0 | 35.0 | 32.5 | 35.0 |

|       | 17 | 18 | 19 | 20 | 21 | 22 | 23 | 24 |
|-------|------|------|------|------|------|------|------|------|
| $Li_2O$ | 7.0 | — | — | — | — | — | — | — |
| $Na_2O$ | 8.0 | — | — | — | — | — | — | — |
| $K_2O$  | 5.0 | — | — | — | — | — | — | — |
| ZnO     | 2.5 | 45.0 | 30.0 | 15.0 | 44.0 | 29.0 | 15.0 | 13.5 |
| SnO     | 1.0 | — | — | — | 1.0 | 1.0 | — | 1.0 |
| PbO     | 17.5 | — | — | — | — | — | — | — |
| $Sb_2O_3$ | 23.0 | — | 15.0 | 30.0 | — | 15.0 | 30.0 | 30.0 |
| $Al_2O_3$ | 2.2 | 2.0 | — | — | 2.0 | 2.0 | — | 0.5 |
| $Ag_2O$ | — | 20.0 | 20.0 | 20.0 | — | — | — | — |
| $Tl_2O$ | — | — | — | — | 20.0 | 20.0 | 20.0 | 20.0 |
| $P_2O_5$ | 33.8 | 33.0 | 35.0 | 35.0 | 33.0 | 33.0 | 35.0 | 35.0 |

|       | 25 | 26 | 27 | 28 | 29 | 30 | 31 | 32 |
|-------|------|------|------|------|------|------|------|------|
| $Li_2O$ | — | 7.0 | 6.7 | 7.0 | 5.3 | 7.0 | 7.0 | 7.0 |
| $Na_2O$ | — | 8.0 | 7.6 | 8.0 | 6.0 | 8.0 | 8.0 | 8.0 |
| $K_2O$  | — | 5.0 | 4.8 | 5.0 | 3.7 | 5.0 | — | — |
| ZnO     | — | — | 9.5 | — | — | 23.5 | 24.5 | 24.5 |
| CaO     | — | 7.5 | 9.5 | — | — | 10.0 | 11.3 | 11.3 |
| BaO     | — | 7.5 | 3.3 | — | — | 5.0 | 3.7 | 3.7 |
| SnO     | 1.0 | 1.0 | 1.0 | — | — | — | 1.0 | — |
| $Sb_2O_3$ | 43.5 | 28.5 | 19.1 | 55.0 | 53.0 | — | 4.1 | 4.1 |
| $Bi_2O_3$ | — | — | — | — | — | 6.0 | — | — |
| $Al_2O_3$ | — | 0.5 | 0.5 | — | — | 0.5 | 0.4 | 0.4 |
| $Ag_2O$ | — | — | — | — | — | — | — | 5.0 |
| $Tl_2O$ | 20.0 | — | — | — | — | — | 5.0 | — |
| $P_2O_5$ | 35.0 | 35.0 | 33.3 | 25.0 | 30.0 | 35.0 | 35.0 | 35.0 |
| CuO     | — | — | — | — | 2.0 | — | — | — |
| $B_2O_3$ | — | — | 5.0 | — | — | — | — | — |

TABLE IA (Parts By Weight)

|       | 1 | 2 | 3 | 4 | 5 | 6 | 7 | 8 |
|-------|------|------|------|------|------|------|------|------|
| $Li_2O$ | 1.6 | 1.5 | 1.5 | 1.6 | 1.5 | 1.4 | 1.4 | 1.1 |
| $Na_2O$ | 3.8 | 3.6 | 3.5 | 3.7 | 3.6 | 8.0 | 8.0 | 2.7 |
| $K_2O$  | 3.6 | 3.4 | 3.3 | 3.5 | — | — | — | — |
| ZnO     | 8.4 | 6.5 | 5.8 | 12.8 | 10.9 | 7.4 | 5.8 | 4.4 |
| CaO     | 4.3 | 4.1 | 4.0 | 3.2 | 4.1 | 3.8 | 3.7 | 3.0 |
| BaO     | 5.8 | 5.6 | 3.8 | 8.6 | 5.6 | 5.2 | 5.0 | 2.9 |
| SnO     | 1.2 | 1.1 | 1.1 | 1.1 | 1.1 | 1.0 | 1.0 | 0.8 |
| $Sb_2O_3$ | 33.2 | 37.3 | 41.3 | — | 21.2 | 29.5 | 33.3 | 31.3 |
| $Bi_2O_3$ | — | — | — | 28.0 | — | — | — | — |
| $Tl_2O$ | — | — | — | — | 15.4 | 14.3 | 13.8 | 26.8 |
| $Al_2O_3$ | 0.4 | 0.4 | 0.4 | — | 0.4 | 0.3 | 0.3 | 0.3 |
| $P_2O_5$ | 41.0 | 36.3 | 35.2 | 37.3 | 36.1 | 33.5 | 32.4 | 26.6 |

|       | 9 | 10 | 11 | 12 | 13 | 14 | 15 | 16 |
|-------|------|------|------|------|------|------|------|------|
| $Li_2O$ | 1.5 | 1.3 | 1.3 | 1.4 | 1.2 | 1.1 | 1.1 | 1.1 |
| $Na_2O$ | 3.4 | 3.0 | 3.1 | 3.3 | 2.9 | 2.6 | 2.6 | 2.5 |
| $K_2O$  | 3.3 | 2.9 | 2.9 | 3.1 | 2.7 | 2.5 | 2.4 | 2.4 |
| ZnO     | 5.6 | 5.0 | 5.0 | 9.9 | 4.0 | — | — | 1.2 |
| CaO     | 2.6 | 0.6 | 1.2 | — | — | — | — | — |
| BaO     | 7.2 | 1.7 | — | — | — | — | — | — |
| SnO     | 1.0 | 0.9 | 0.9 | 1.0 | 0.9 | 0.8 | 0.8 | 0.9 |
| $Sb_2O_3$ | 40.4 | 53.7 | 54.2 | 48.1 | 59.1 | 66.5 | 69.0 | 36.5 |
| $Al_2O_3$ | 0.4 | 0.3 | 0.3 | 0.3 | 0.3 | 0.3 | 0.3 | 1.3 |
| $P_2O_5$ | 34.4 | 30.5 | 30.8 | 32.8 | 28.8 | 26.1 | 23.7 | 28.5 |

TABLE IA-continued (Parts By Weight)

|       | 17 | 18 | 19 | 20 | 21 | 22 | 23 | 24 |
|-------|------|------|------|------|------|------|------|------|
| $Li_2O$ | 1.2 | — | — | — | — | — | — | — |
| $Na_2O$ | 2.9 | — | — | — | — | — | — | — |
| $K_2O$  | 2.7 | — | — | — | — | — | — | — |
| ZnO     | 1.2 | 27.8 | 14.9 | 6.2 | 20.9 | 11.6 | 5.2 | 4.7 |
| $Ag_2O$ | — | 35.2 | 28.2 | 23.7 | — | — | — | — |
| PbO     | 22.7 | — | — | — | — | — | — | — |
| SnO     | 0.8 | — | — | — | 0.9 | 0.7 | — | 0.6 |
| $Sb_2O_3$ | 39.0 | — | 26.6 | 44.6 | — | 27.6 | 37.3 | 37.2 |
| $Tl_2O$ | — | — | — | — | 49.6 | 41.9 | 36.2 | 36.1 |
| $Al_2O_3$ | 1.3 | 1.6 | — | — | 1.2 | 1.0 | — | 0.2 |
| $P_2O_5$ | 27.9 | 33.5 | 30.2 | 25.4 | 27.4 | 23.1 | 21.2 | 21.1 |

|       | 25 | 26 | 27 | 28 | 29 | 30 | 31 | 32 |
|-------|------|------|------|------|------|------|------|------|
| $Li_2O$ | — | 1.3 | 1.5 | 1.0 | 0.8 | 1.7 | 1.7 | 1.8 |
| $Na_2O$ | — | 3.1 | 3.4 | 2.4 | 1.8 | 4.1 | 4.0 | 4.4 |
| $K_2O$  | — | 2.9 | 3.3 | 2.3 | 1.7 | 3.9 | — | — |
| ZnO     | — | — | 5.6 | — | — | 15.6 | 16.1 | 18.3 |
| CaO     | — | 2.6 | 3.9 | — | — | 4.6 | 5.1 | 5.6 |
| BaO     | — | 7.1 | 3.7 | — | — | 6.3 | 4.6 | 5.1 |
| SnO     | 0.6 | 0.9 | 1.0 | — | — | — | 1.2 | — |
| $Sb_2O_3$ | 48.1 | 51.1 | 40.3 | 77.0 | 74.3 | — | 9.7 | 10.5 |
| $Bi_2O_3$ | — | — | — | — | — | 22.9 | — | — |
| $Tl_2O$ | 32.2 | — | — | — | — | — | 17.1 | — |
| $Al_2O_3$ | 0.2 | 0.3 | 0.4 | — | — | 0.4 | 0.3 | 0.4 |
| $P_2O_5$ | 18.8 | 30.6 | 34.4 | 17.1 | 20.5 | 40.6 | 40.1 | 43.8 |
| CuO     | — | — | — | — | 0.8 | — | — | — |
| $B_2O_3$ | — | — | 2.4 | — | — | — | — | — |
| $Ag_2O$ | — | — | — | — | — | — | — | 10.2 |

Table II records the softening point (S.P.) and the annealing point (A.P.) in °C., the linear coefficient of thermal expansion (Exp) over the temperature interval 25°-300° C. expressed in terms of $\times 10^{7-}/°C$, the refractive index ($n_D$), and the dispersion ($\nu$) determined in accordance with measuring techniques conventional in the glass art. Table II also reports the weight loss (W.L.) expressed in terms of percent demonstrated by the glasses after an immersion for six hours in a bath of boiling deionized water, and a qualitative analysis of the weatherability (Weath) of the glasses based upon the visual appearance thereof after an exposure in a humidity cabinet for 500 hours at 60° C. and 98% relative humidity. A weight loss greater than 0.33% is considered to represent unsatisfactory chemical durability, with losses less than 0.1% being greatly preferred. Legends for the weatherability character exhibited include: nc = no change in appearance; xl = extremely light frosted appearances; vl = very light frosted appearance; lt = light frosted appearance; and hf = heavy frosted appearance. The most preferred glasses will display no frosting or haze. Where haze can be observed only when the glass is viewed at a small angle (exemplified by xl and vl), however, the glasses will be satisfactory for use in most applications. (When subjected to the above-described weatherability test, the current commercial glass produced under U.S. Pat. No. 4,362,819, supra, exhibits a very light frosted appearance.)

TABLE II

|       | 1 | 2 | 3 | 4 | 5 | 6 | 7 | 8 |
|-------|------|------|------|------|------|------|------|------|
| S.P.  | 438 | 445 | 437 | ~440 | 426 | — | — | — |
| A.P.  | 333 | 336 | 333 | ~335 | ~325 | — | — | — |
| Exp.  | 153 | 149 | 152 | ~153 | — | — | — | — |
| $n_D$ | 1.682 | 1.696 | 1.710 | ~1.670 | 1.686 | 1.72 | ~1.73 | 1.77 |
| $\nu$ | 40 | 35 | — | ~40 | — | — | — | — |
| W.L.  | 0.02 | 0.02 | 0.04 | 0.01 | 0.01 | 0.00 | — | — |
| Weath | nc | nc | nc | — | nc | nc | nc | nc |

|       | 9 | 10 | 11 | 12 | 13 | 14 | 15 | 16 |
|-------|------|------|------|------|------|------|------|------|
| S.P.  | 433 | 414 | 415 | 409 | 407 | 396 | 396 | ~410 |

TABLE II-continued

|       | | | | | | | | |
| --- | --- | --- | --- | --- | --- | --- | --- | --- |
| A.P. | ~330 | ~315 | ~315 | ~310 | ~310 | ~300 | ~300 | ~310 |
| Exp. | — | 169 | 162 | 160 | 160 | 164 | 180 | — |
| $n_D$ | 1.71 | 1.75 | 1.755 | 1.72 | 1.77 | 1.83 | >1.80 | ~1.77 |
| W.L. | 0.04 | 0.26 | 0.22 | 0.19 | 0.21 | 0.24 | 0.27 | 0.01 |
| Weath | nc | nc | nc | vl | nc | nc | nc | xl |

|       | 17 | 18 | 19 | 20 | 21 | 22 | 23 | 24 |
| --- | --- | --- | --- | --- | --- | --- | --- | --- |
| S.P. | ~400 | 372 | — | — | 416 | 419 | — | — |
| A.P. | ~300 | ~280 | — | — | ~315 | ~320 | 0 | 0 |
| $n_D$ | 1.76 | 1.681 | 1.760 | >1.80 | 1.696 | 1.783 | >1.80 | >1.80 |
| W.L. | 0.01 | 0.04 | 0.05 | — | 0.02 | 0.01 | — | — |
| Weath | xl | — | — | — | — | — | nc | nc |

|       | 25 | 26 | 27 | 28 | 29 | 30 | 31 | 32 |
| --- | --- | --- | --- | --- | --- | --- | --- | --- |
| S.P. | — | ~445 | ~450 | ~382 | ~400 | 435 | 420 | ~405 |
| A.P. | — | 336 | ~345 | — | — | 325 | ~320 | 307 |
| Exp. | — | 160 | 139 | — | — | 149 | — | 150 |
| $n_D$ | >1.80 | ~1.79 | ~1.71 | 1.86 | >1.8 | 1.644 | 1.643 | 1.638 |
| $v$ | — | — | — | — | — | 43 | — | — |
| W.L. | — | — | 0.02 | — | — | 0.00 | — | 0.01 |
| Weath | nc | nc | nc | vl | — | hf | nc | lt |

As can be observed from the above Tables, Examples 30-32 illustrate glasses having compositions somewhat outside of the ranges yielding glasses demonstrating the desired chemical and physical properties. That is, because of the lack of control of the amounts and the interrelationships existing between the individual components, one or more of the properties listed in Table II will not be satisfactory.

Based upon an overall appraisal of the chemical and physical properties demonstrated by the inventive glasses in conjunction with their melting and forming characteristics, the preferred glasses consist essentially, expressed in terms of mole percent on the oxide basis, of

| | | | |
| --- | --- | --- | --- |
| $P_2O_5$ | 25-35 | SrO | 0-20 |
| ZnO | 0-35 | BaO | 0-20 |
| $Li_2O$ | 0-10 | CaO + SrO + BaO | 0-20 |
| $Na_2O$ | 0-15 | $Sb_2O_3$ | 0-61 |
| $K_2O$ | 0-6 | $Bi_2O_3$ | 0-10 |
| $Ag_2O$ | 0-25 | $Sb_2O_3 + Bi_2O_3$ | 0-61 |
| $Tl_2O$ | 0-25 | $Sb_2O_3 + Bi_2O_3 + Ag_2O + Tl_2O$ | 7-76 |
| $Li_2O + Na_2O + K_2O + Ag_2O + Tl_2O$ | 15-25 | SnO | 0-2 |
| PbO | 0-20 | $Al_2O_3$ | 0-3 |
| CuO | 0-3 | $B_2O_3$ | 0-3 |
| CaO | 0-20 | $Al_2O_3 + B_2O_3$ | 0-5 |
| $CeO_2$ | 0-2 | | |

The most preferred composition for a glass having a refractive index ~1.7 is Example 3 and for a glass having a refractive index ~1.8 is Example 14.

Although the inventive glasses were designed particularly for being press molded into optically finished lenses, their chemical and physical properties recommend their utility in preparing glass-plastic alloys of the type described in U.S. application Ser. No. 07/403,655, filed Sep. 11, 1989, under the title GLASS/GLASS-CERAMIC-PLASTIC ALLOY ARTICLES by W. A. Bahn et al. now U.S. Pat. No. 5043,369.

I claim

1. A glass having a composition which is essentially fluorine-free and which exhibits an annealing point between 300°-340° C., a linear coefficient of thermal expansion over the temperature interval 25°-300° C. between $135-180 \times 10^{-7}/°C.$, a refractive index of at least 1.65, and a weight loss after exposure to boiling water for six hours no greater than 0.33% consisting essentially, expressed in terms of mole percent on the oxide basis, of:

| | |
| --- | --- |
| $P_2O_5$ | 24-36 |
| ZnO | 0-45 |
| $Li_2O$ | 0-15 |
| $Na_2O$ | 0-20 |
| $K_2O$ | 0-10 |
| $Ag_2O$ | 0-25 |
| $Tl_2O$ | 0-25 |
| $Li_2O + Na_2O + K_2O + Ag_2O + Tl_2O$ | 15-30 |
| PbO | 0-20 |
| CaO | 0-20 |
| CuO | 0-5 |
| $CeO_2$ | 0-2 |
| SrO | 0-20 |
| BaO | 0-20 |
| CaO + SrO + BaO | 0-25 |
| $Sb_2O_3$ | 0-61 |
| $Bi_2O_3$ | 0-10 |
| $Sb_2O_3 + Bi_2O_3$ | 0-61 |
| $Sb_2O_3 + Bi_2O_3 + Ag_2O + Tl_2O$ | 7-76 |
| SnO | 0-5 |
| $Al_2O_3$ | 0-5 |
| $B_2O_3$ | 0-10 |
| $Al_2O_3 + B_2O_3$ | 0-10 | with the provisos that:
(a) in the absence of $Sb_2O_3$ and/or $Bi_2O_3$, the total $Ag_2O+Tl_2O$ will range 11-25;
(b) in the absence of $Ag_2O$ and/or $Tl_2O$, the total $Sb_2O_3+Bi_2O_3$ will range 7-61;
(c) when present in the absence of $Bi_2O$ and/or $Ag_2O$ and/or $Tl_2O$, $Sb_3O_3$ will range 10-61 and, when present in the absence of $Sb_2O_3$ and/or $Ag_2O$ and-/or $Tl_2O$, $Bi_2O_3$ will range 7-10;
(d) when present in the absence of $Bi_2O_3$, $Sb_2O_3$, and $Tl_2O$, $Ag_2O$ will range 13-25; and
(e) when present in the absence of $Ag_2O$, $Bi_2O_3$, and $Sb_2O_3$, $Tl_2O$ will range 11-25.

2. A glass according to claim 1 consisting essentially of:

| | | | |
| --- | --- | --- | --- |
| $P_2O_5$ | 25-35 | SrO | 0-20 |
| ZnO | 0-35 | BaO | 0-20 |
| $Li_2O$ | 0-10 | CaO + SrO + BaO | 0-20 |
| $Na_2O$ | 0-15 | $Sb_2O_3$ | 0-61 |
| $K_2O$ | 0-6 | $Bi_2O_3$ | 0-10 |
| $Ag_2O$ | 0-25 | $Sb_2O_3 + Bi_2O_3$ | 0-61 |
| $Tl_2O$ | 0-25 | $Sb_2O_3 + Bi_2O_3 + Ag_2O + Tl_2O$ | 7-76 |
| $Li_2O + Na_2O + K_2O +$ | 15-25 | SnO | 0-2 |

| | | | |
|---|---|---|---|
| -continued | | | |
| $Ag_2O + Tl_2O$ | | | |
| PbO | 0–20 | $Al_2O_3$ | 0–3 |
| CuO | 0–3 | $B_2O_3$ | 0–3 |
| CaO | 0–20 | $Al_2O_3 + B_2O_3$ | 0–5 |
| $CeO_2$ | 0–2. | | |

3. A lens prepared from a glass having a composition which is essentially fluorine-free and which exhibits an annealing point between 300°–340° C., a linear coefficient of thermal expansion over the temperature interval 25°–300° C. between $135-180 \times 10^{-7}/°C.$, a refractive index of at least 1.65, and a weight loss after exposure to boiling water for six hours no greater than 0.33% consisting essentially, expressed in terms of mole percent on the oxide basis, of:

| | |
|---|---|
| $P_2O_5$ | 24–36 |
| ZnO | 0–45 |
| $Li_2O$ | 0–15 |
| $Na_2O$ | 0–20 |
| $K_2O$ | 0–10 |
| $Ag_2O$ | 0–25 |
| $Tl_2O$ | 0–25 |
| $Li_2O + Na_2O + K_2O + Ag_2O + Tl_2O$ | 15–30 |
| PbO | 0–20 |
| CaO | 0–20 |
| CuO | 0–5 |
| $CeO_2$ | 0–2 |
| SrO | 0–20 |
| BaO | 0–20 |
| CaO + SrO + BaO | 0–25 |
| $Sb_2O_3$ | 0–61 |
| $Bi_2O_3$ | 0–10 |
| $Sb_2O_3 + Bi_2O_3$ | 0–61 |
| $Sb_2O_3 + Bi_2O_3 + Ag_2O + Tl_2O$ | 7–76 |
| SnO | 0–5 |
| $Al_2O_3$ | 0–5 |
| $B_2O_3$ | 0–10 |
| $Al_2O_3 + B_2O_3$ | 0–10 | with the provisos that:
(a) in the absence of $Sb_2O_3$ and/or $Bi_2O_3$, the total $Ag_2O + Tl_2O$ will range 11–25;
(b) in the absence of $Ag_2O$ and/or $Tl_2O$, the total $Sb_2O_3 + Bi_2O_3$ will range 7–61;
(c) when present in the absence of $Bi_2O_3$ and/or $Ag_2O$ and/or $Tl_2O$, $Sb_2O_3$ will range 10–61 and, when present in the absence of $Sb_2O_3$ and/or $Ag_2O$ and/or $Tl_2O_3$ will range 7–10;
(d) when present in the absence of $Bi_2O_3$, $Sb_2O_3$, and $Tl_2O$, $Ag_2O$ will range 13–25; and
(e) when present in the absence of $Ag_2O$, $Bi_2O_3$, and $Sb_2O_3$, $Tl_2O$ will range 11–25.

4. A lens according to claim 3 prepared from a glass having a composition consisting essentially of:

| | | | |
|---|---|---|---|
| $P_2O_5$ | 25–35 | SrO | 0–20 |
| ZnO | 0–35 | BaO | 0–20 |
| $Li_2O$ | 0–10 | CaO + SrO + BaO | 0–20 |
| $Na_2O$ | 0–15 | $Sb_2O_3$ | 0–61 |
| $K_2O$ | 0–6 | $Bi_2O_3$ | 0–10 |
| $Ag_2O$ | 0–25 | $Sb_2O_3 + Bi_2O_3$ | 0–61 |
| $Tl_2O$ | 0–25 | $Sb_2O_3 + Bi_2O_3 + Ag_2O + Tl_2O$ | 7–76 |
| $Li_2O + Na_2O + K_2O + Ag_2O + Tl_2O$ | 15–25 | SnO | 0–2 |
| PbO | 0–20 | $Al_2O_3$ | 0–3 |
| CuO | 0–3 | $B_2O_3$ | 0–3 |
| CaO | 0–20 | $Al_2O_3 + B_2O_3$ | 0–5 |
| $CeO_2$ | 0–2. | | |

* * * * *

UNITED STATES PATENT AND TRADEMARK OFFICE
CERTIFICATE OF CORRECTION

PATENT NO. : 5,153,151
DATED : October 6, 1992
INVENTOR(S) : Bruce G. Aitken It is certified that error appears in the above-identified patent and that said Letters Patent is hereby corrected as shown below:

In column 1, line 8, "5021,366" should read --5,021,366,--.

In column 3, line 36, "$Bi2O_3$" should read --$Bi_2O_3$--.

In column 7, line 60, "5043,369" should read --5,043,369--.

IN THE CLAIMS

Claim 3, column 10, line 11, "714 61" should read --7-61--.

Claim 3, column 10, line 15, "$Tl_2O_3$ will range" should read $Tl_2O$, $Bi_2O_3$ will range--

Signed and Sealed this

Twenty-sixth Day of October, 1993

Attest:

BRUCE LEHMAN

*Attesting Officer*          Commissioner of Patents and Trademarks